UNITED STATES PATENT OFFICE.

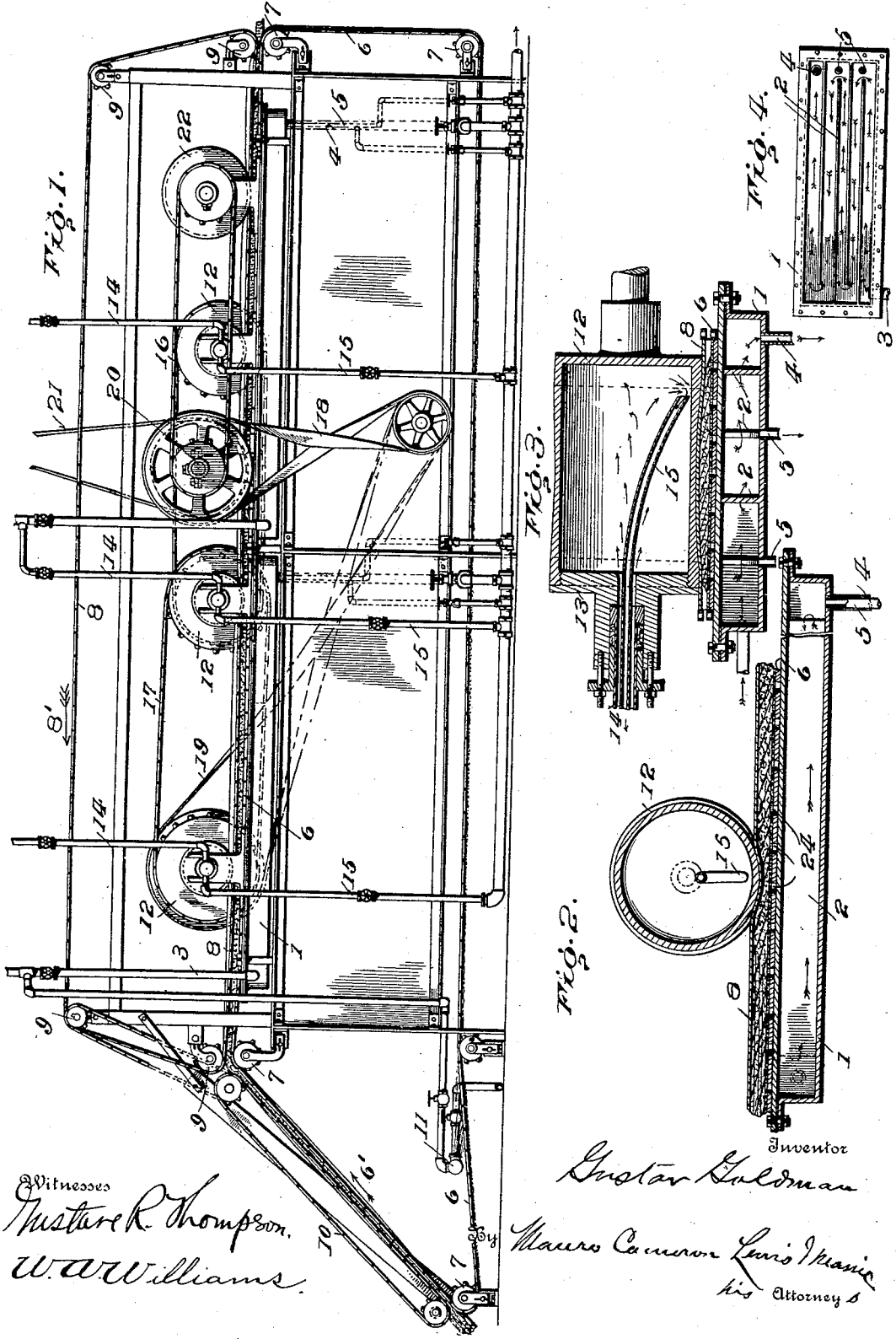

GUSTAV GOLDMAN, OF BALTIMORE, MARYLAND.

STEAM-TABLE.

No. 869,895.  Specification of Letters Patent.  Patented Nov. 5, 1907.

Application filed September 22, 1904. Serial No. 225,540.

*To all whom it may concern:*

Be it known that I, GUSTAV GOLDMAN, of Baltimore, Maryland, have invented a new and useful Improvement in Steam-Tables, which invention is fully set forth in the following specification.

This invention relates to means for subjecting material preferably in sheet form, to heat and pressure while the sheet is in motion, and, if desired, simultaneously supplying moisture to or subtracting moisture from the material.

In my United States Patent No. 758,243 dated April 26, 1904, I have described a process of matting or felting fibers together by introducing dry finely divided binding material between the fibers and subsequently converting the dry material into an active binder for the fibers. In thus converting the dry binding material into an active binder I may employ heat and pressure, and, if desired, moisture. And in my United States Patent No. 768,599 dated Aug. 30, 1904, I have described another process whereby a mass of fibers is treated with a liquid binder, after which the fibers are separated and laid down in a light fluffy sheet or mass, after which they are dried, preferably by extracting any excess of liquid and subjecting them to heat and pressure.

The present invention has for its object to supply continuously operating means for automatically subjecting the fibers to heat and pressure and supplying or abstracting the moisture from the fibers, as the case may be, in practicing the above named or similar processes, though its use is not limited to the processes mentioned, since it will be apparent that the mechanism may be used in a great variety of mechanical operations where heat and pressure, either with or without the addition or subtraction of moisture to or from the material under treatment.

With these objects in view the invention consists in means continuously advancing in a given direction the material to be treated, means for subjecting the same to heat and pressure, as it advances, combined with means for supplying or abstracting moisture therefrom, which latter means preferably act simultaneously with the heating and pressing devices. As a convenient means of supplying heat to one side of the sheet or mass there is provided a flat topped chamber or box heated in any suitable manner, as by steam, and hereinafter referred to as the steam table. For the purpose of causing the steam or other heating medium to evenly heat the entire upper surface of the chamber the same may be provided with transversely or longitudinally extending baffle plates so that the heating medium is compelled to follow a devious course through the chamber and come into contact with every part of the upper wall of the same. The material is advanced along the surface of the steam table in any suitable way, preferably by being received between two carrying belts moving parallel with the surface of the table, and in the construction herein shown to illustrate the invention one of these belts is provided with a moisture absorbing material, as absorbent cotton, for carrying moisture to or abstracting it from the material, as may be desired. As the material is advanced along the steam table it is subjected to the action of pressure rollers mounted above but in close proximity to the surface of the table. Preferably these rollers are also heated, as by steam, so that heat is supplied to both sides of the mass of fibers or other material as it advances.

The inventive idea involved may receive a great variety of mechanical expressions one of which is, for the purpose of illustration, shown in the accompanying drawings, in which Figure 1 is a side elevation of the apparatus; Fig. 2 is a broken longitudinal section through the end of the table and one roller; Fig. 3 is a transverse section across the table and through one roller; and Fig. 4 is a reduced plan of the table with the upper plate removed to show the arrangement of the baffle-plates.

Referring to the drawings, 1 indicates the steam table in the form of a closed chamber, preferably of metal, and provided with baffle plates 2, around which the steam or other heating medium passes from the entrance pipe 3 to the exit pipe 4, drain pipes 5 being provided in the bottom of the chamber for carrying off condensed steam when steam is employed. This chamber is supported upon any suitable frame-work and has an endless belt 6 driven by sprocket-wheels 7 engaging sprocket-chains at the sides of the belt 6, the belt being so mounted as to move across the top of the table in contact therewith or in close proximity thereto, from left to right as shown in Fig. 1. Another belt 8, (Fig. 1) is mounted on sprocket-wheels 9 above the table and its lower section moves also from left to right slightly above and parallel with the belt 6, the direction of movement of the belts 6 and 8 being indicated by the arrows 6' and 8' respectively. If the material to be treated is delivered at a point below the level of the steam table it may be elevated between an inclined part of belt 6 and a third belt 10. If moisture is to be supplied to the material under treatment it is supplied to the absorbent belt 6 in any suitable manner as by jets of steam or water issuing from a pipe 11.

Mounted in suitable bearings secured to the sides of the steam table are a plurality of rollers 12. These rollers are so mounted that they exert pressure upon the belts 6 and 8 and the material between said belts, as clearly shown in Figs. 2 and 3. The shape of these rollers in longitudinal section is such as to conform to the shape in cross-section of the sheet or mass of material to be treated. If the sheet or mass of material under treatment is one of even thickness from side to side the rollers would preferably be flat, but if, for example, a sheet of fibers which tapered towards its edges was under treatment the peripheral contour of the rollers would be hollowed out or depressed, as shown in Fig. 3, in order that the pressure of the roller might be evenly distributed across the entire sheet or mass of the fibers. In many cases it is desirable to supply a heating medium, as steam, to the interior of the rollers. For this purpose the rollers are made hollow, preferably having one head and the peripheral walls cast integral, the other head 13 (Fig. 3) being suitably secured to the barrel so as to form a steam-tight joint. Through the axis of one of the heads, preferably the separable head 13, is passed a conduit 14 for conducting steam or other heating medium to the interior of the roller; a suitable packing joint being supplied if necessary. In order that condensed steam may be withdrawn from the roller an exit pipe 15, smaller than pipe 14, enters the roller through the latter pipe and has its interior open end in close proximity to the lower interior side of the roller. Since he pipes 14 and 15 do not revolve with the roller it will be seen that the interior end of pipe 15 is always in a position to receive the condensed steam which will be forced outward by the pressure of the live steam behind it.

The rollers herein described constitute the subject-matter of claims in my copending application Sr. No. 231,117, filed Nov. 2, 1904, and are therefore not herein specifically claimed.

The several rollers are or may be substantially similar in construction and are all revolved in the same direction from any suitable source of power, as by sprocket-chains 16, 17, driving belts 18 and 19 connecting to power shaft 20 driven by belt 21. If desired, some of the rollers may have the heating appliances omitted, as shown in roller 22, which is arranged to exert pressure upon, but not to supply heat to, the material treated.

It will be understood that the belts 6, 8, and 10 are driven at the same speed from any source of power, as the belt 21, the connections for this purpose being omitted for clearness. The admission of steam or other heating medium to the chamber of the steam table and to the interior of the rollers is controlled by valves in the various steam pipes, as will be readily understood from an inspection of the drawings.

The operation of the device is as follows:—Steam being admitted to the chamber of the steam table and to the hollow rollers 12, and the belts 6, 8 and 10 and rollers 12 and 22 being set in motion in the directions indicated by the several arrows, the material (here shown as a sheet or layer of fibers) is inserted between the belts 6 and 10 at the lower left-hand extremity of Fig. 1 and by these belts is advanced to the level of the steam table where it is passed between belts 6 and 8 and by them is carried along the surface of the steam table and under the rollers, 12, 12, 12 and 22. The belt 6 being an absorbent belt and having moisture supplied thereto by the jets of pipe 11, the heat of the table and of the rollers 12, 12, 12 serves to convert the moisture in the belt 6 into steam and causes it to permeate throughout the mass of fibers in the sheet or layer, which sheet or layer is also subjected to pressure from the rollers, as clearly shown in Figs. 2 and 3. If the fibers have between them a dry binding material, (as would be the case in practicing the method set out in my United States Patent No. 758,243, above referred to) the heat or the moisture, or both the heat and the moisture, would serve to convert such binding material into an active binder for the fibers and the pressure of the rollers would then serve to render the same effective in binding the fibers together. In case the fibers had been treated with a wet binder the absorbent belt 6, would not have any moisture supplied to it from the pipe 11, and the heat of the table and rollers would serve to dry the wet binder and the pressure of the rollers would serve to render the binder effective as the drying operation proceeded.

If it were desired to abstract moisture from a sheet of material passed over the table the jets from pipe 11 would be closed and the absorbent belt 6 would abstract the moisture under pressure from the rollers and the heat of the table and rollers would cause the same to be rapidly evaporated from the belt 6. This latter belt may be of any suitable construction to enable it to absorb or impart moisture, but preferably it is of the character shown in my United States Patent No. 794,402, dated July 11, 1905.

It will be observed from an inspection of Figs. 2 and 3 that this belt is provided with a large number of perforations 24 which afford ready access of the steam to the material, or ready exit of moisture therefrom, as the case may be.

Having thus described the invention, what is claimed is:—

1. The combination of a heated surface, means advancing material along said surface, a plurality of rollers acting to compress said material between them and said surface as the material advances, and means admitting a heating medium to the interior of said rollers.

2. The combination of a heated surface, a pair of parallel-moving belts receiving material between them and advancing it along said surface, a plurality of hollow rollers acting to compress said material between them and the said surface, and means admitting steam to and conducting steam from said hollow rollers during their revolutions.

3. The combination of a heated surface, means including an absorbent for advancing material along said surface, and a plurality of steam heated pressure rollers acting to compress the material and belt between said surface and rollers as said belt and material advance.

4. The combination of a heating surface, an endless carrier belt of absorbent material traveling over said surface, a plurality of retaining belts moving parallel to and with the same velocity as said carrier belt, rollers acting to compress material carried between said belts; one or more of said rollers being provided with heating means.

5. The combination of a plane heating surface, an endless carrier belt of absorbent material advancing material over said surface, a parallel retaining belt movable therewith, and heated rollers acting to compress the material between said belts.

6. The combination of a heating surface, a pair of par allel moving belts for advancing material between them along said surface, a plurality of compresser rollers each provided with heating means and acting to compress said material while passing over said heating surface and a non-heated roller acting to compress the material as it leaves the said heating surface.

7. The combination of a heating surface, a pair of parallel belts for advancing material between them along said surface, one of said belts having perforations and composed of absorbent material, a plurality of rollers acting to compress the material as it passes over said heating surface, one or more of said rollers being provided with heating means.

In testimony whereof I have signed this specification in the presence of two subscribing witnesses.

GUSTAV GOLDMAN.

Witnesses:
   S. T. CAMERON,
   REEVE LEWIS.